(12) United States Patent
Lete

(10) Patent No.: US 7,224,667 B2
(45) Date of Patent: May 29, 2007

(54) PROCESS FOR KEEPING AND/OR RESTORING COMMUNICATION LINKS IN A PLANNED NETWORK WITH MOBILE COMPONENTS

(75) Inventor: Ghislain Lete, Paris (FR)

(73) Assignee: Thales, Paris (FR)

( * ) Notice: Subject to any disclaimer, the term of this patent is extended or adjusted under 35 U.S.C. 154(b) by 828 days.

(21) Appl. No.: 09/961,344

(22) Filed: Sep. 25, 2001

(65) Prior Publication Data

US 2002/0041582 A1  Apr. 11, 2002

(30) Foreign Application Priority Data

Sep. 26, 2000  (FR) .................................. 00 12216

(51) Int. Cl.
*H04L 12/26* (2006.01)
*H04B 7/15* (2006.01)

(52) U.S. Cl. ...................... 370/216; 370/254; 370/321; 370/347; 455/8; 455/11.1

(58) Field of Classification Search ................ 370/235, 370/236, 225–228, 337, 329, 336, 315, 254, 370/319, 236.1, 321; 455/8, 11.1, 13.1; 709/226, 709/229
See application file for complete search history.

(56) References Cited

U.S. PATENT DOCUMENTS

| | | | |
|---|---|---|---|
| 5,301,354 A * | 4/1994 | Schwendeman et al. ... | 455/13.1 |
| 5,323,384 A | 6/1994 | Norwood et al. | |
| 5,943,322 A | 8/1999 | Mayor et al. | |
| 6,571,284 B1 * | 5/2003 | Suonvieri .................... | 709/221 |
| 6,718,158 B1 * | 4/2004 | Suonvieri ...................... | 455/9 |
| 2002/0028655 A1 * | 3/2002 | Rosener et al. ............... | 455/16 |

FOREIGN PATENT DOCUMENTS

| | | | |
|---|---|---|---|
| GB | 2327019 A | * | 1/1999 |
| WO | WO 96/25808 | | 8/1996 |
| WO | WO 98/29962 | | 7/1998 |

OTHER PUBLICATIONS

Geg-Marconi Hazeltine: "Link-16 Summary" XP-002175223, HTTP://PRODEVWEB.PRODEV.USNA.EDU., Apr. 1997, Summary written, May 1997 , pp. 1-6.

* cited by examiner

*Primary Examiner*—Hassan Kizou
*Assistant Examiner*—Brian Roberts
(74) *Attorney, Agent, or Firm*—Oblon, Spivak, McClelland, Maier & Neustadt, P.C.

(57) ABSTRACT

A process for keeping and/or restoring communications within a network with planned resources, the network includes stations arranged in at least one group, wherein each group is composed of at least two stations that are linked together, and the links between the at least two stations can change with a time. The process includes the following steps: associating a dummy station to one of the groups, the dummy station includes different resources, wherein the different resources are allocated to the stations in the groups; setting-up a relay station configured to keep and/or to restore communications between the stations of the groups, based on information about how a group structure evolves; and reallocating resources of the dummy station to the relay station after setting-up the relay station, based on information about how a group structure evolves.

16 Claims, 1 Drawing Sheet

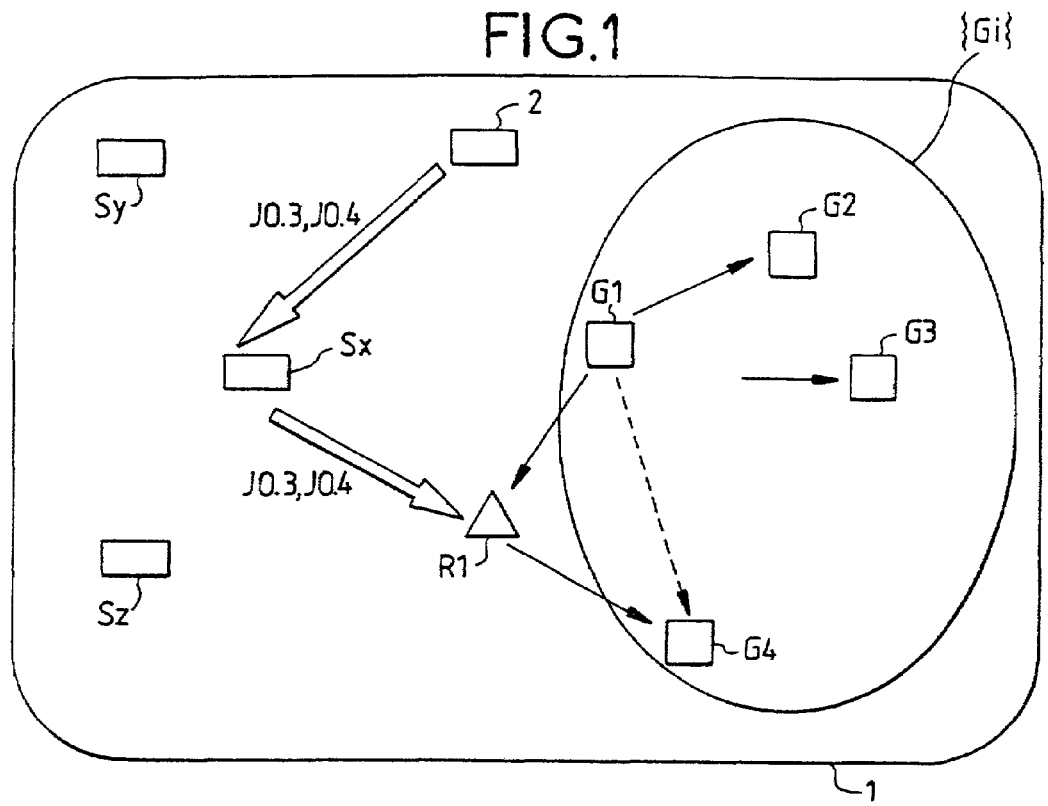
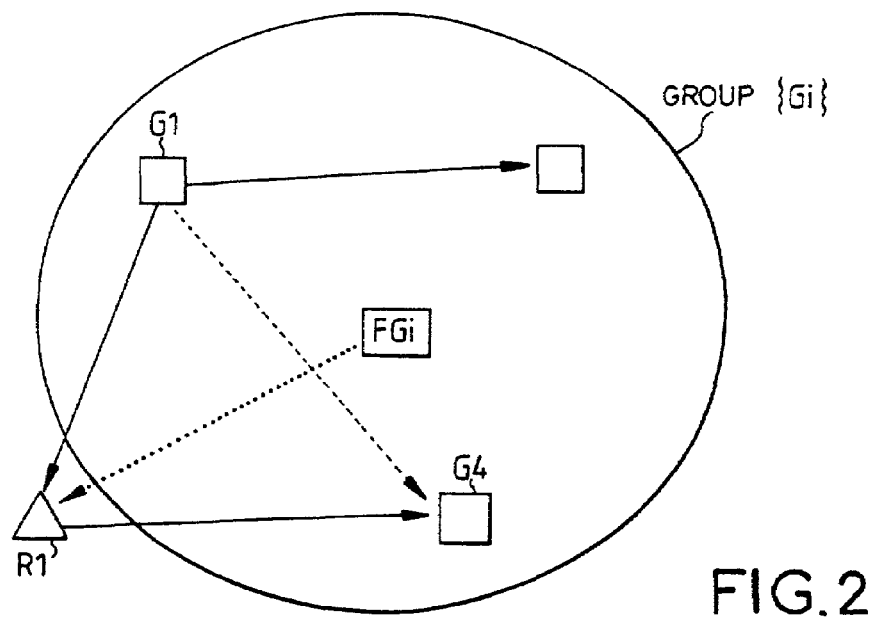

PROCESS FOR KEEPING AND/OR RESTORING COMMUNICATION LINKS IN A PLANNED NETWORK WITH MOBILE COMPONENTS

FIELD OF THE INVENTION

The invention relates to a process for keeping and/or restoring communication links in a planned network with components that may be mobile.

The invention is particularly applicable in MIDS (Multifunctional Information Distribution System) communication networks based on the MIDS-LV (Multifunctional Information Distribution System Low Volume) radio terminal and its TDMA (Time Division Multiple Access) architecture. The process uses the standard STANAG 5516 (STANdardization Agreement) L16 link (Data Link) protocol.

The invention is particularly applicable to L16 MIDS land network deployments.

BACKGROUND OF THE INVENTION

The MIDS communication network mentioned above is secure, resistant to jamming, non-modal and high capacity. Communications are governed by the definition of the TDMA cycle that is found to be a difficult and complex operation carried out beforehand in a "design" or "network planning" phase, that brings together all MIDS components to be used in the network such as land, air and sea sub-networks sharing TDMA MIDS resources.

L16 MIDS radio networks are usually used in air or sea domains for which one characteristic is its extended radio-electric range, for example several hundred kilometers. The usage mode consists of defining a single organized and controlled network at the complex network design phase.

The use of this type of network is currently becoming widespread on land, firstly for its capacities and secondly for inter-operability needs for combined Land-Air-Sea deployments.

On land, the radio-electric range of the MIDS network has the disadvantage that it is limited to a few tens of kilometers and it is sensitive to the natural environment in which the system is deployed. Obstacles can hinder transmission of information. Thus, communication services between mobile network components may be severely degraded or even inhibited during deployment. Therefore, the mobility appears as a new element or a controlling parameter, for example in the deployment of L16 MIDS networks.

In general, problems associated with a real deployment and in particular mobility for land sub-networks make it necessary to adapt the TDMA cycle. However, the use of this type of network replanning procedure (by adaptation of the TDMA cycle) is incompatible with the expected performances of a MIDS communications system and network organization constraints.

The invention is intended to integrate new usage constraints without failing to respect the fundamental requirement of a MIDS network, which is network organization and control in all phases of the deployment.

In particular, the process according to the invention is intended to define TDMA MIDS-LVT radio networks that match connectivity fluctuations due to the mobility of its components that have notably the following characteristics:
  they ensure continuity of communication services between the mobile components,
  they are deterministic,
  they are stable and
  they are manageable The invention proposes an adaptable MIDS radio network with a constant TDMA cycle and uses the MIDS relaying principle by repromulgation and is based on a balance between the design of the network, its architecture and its real time control.

SUMMARY OF THE INVENTION

The invention relates to a process for keeping and/or restoring communications within a network with planned resources, said network comprising at least several stations Si distributed in subgroups, each of the said subgroups comprising at least one or several groups {Gi} each composed of at least two stations Si connected together, the link between these two stations possibly changing with time.

It is characterized in that it comprises at least the following steps: within a subgroup,
  a) associate a dummy station FGi to a group {Gi}, the dummy station comprising different resources RGi, allocated to stations in the group {Gi},
  b) starting from information about how the structure of the group {Gi} changes:
    c) set up one or several relays Ri adapted to keep and/or to restore communications between the different elements of the group {Gi},
    d) reallocate resources of the dummy station FGi to all relay stations Ri set up.

For example, step d) may be done from a main station adapted for network design and resource allocation, such as an NCS station.

For example, relay stations Ri may be provided with one communication plan for each group {Gi}, and for example resources of the dummy station may be allocated by local activation.

The invention also relates to a system to keep and/or restore communications within a network with planned resources, said network comprising at least several stations Si distributed in several subgroups, each of the said subgroups comprising at least one or several groups {Gi} each comprising at least two stations Si connected to each other, the connection between these two stations possibly varying with time.

It is characterized in that it comprises at least the following within a subgroup:
  a dummy station FGi in connection with a group {Gi} and comprising resources RGi allocated to stations in the group {Gi},
  a device suitable for determining how the structure of the group changes,
  one or several relays Ri adapted to keep and/or restore communications between the different elements of the group {Gi},
  a device for reallocating resources of the dummy station FGi to all installed relay stations Ri.

For example, the process and the system according to the invention may be used for the deployment of L16 MIDS land networks.

In particular, the invention has the advantage that it can maintain communication services at all times.

All network characteristics are known in the design phase. No additional TDMA resources are necessary for relaying during deployment or as communications between different stations change.

Stations keep their initialization file defined during the network design throughout the entire deployment period, so that the nature of the process is iso-plan. There is no need to implement the design procedure during deployment.

Relays are standardized and can be used as a function of relay needs observed during deployment.

Resources allocated to each station are fully defined at the network design stage.

BRIEF DESCRIPTION OF THE DRAWINGS

Other characteristics and advantages will become apparent when reading the detailed description of an embodiment used as a non-limitative example and illustrated by the attached drawings in which:

FIG. 1 shows an L16 MIDS network, and

FIG. 2 diagrammatically shows a group of stations with links that can vary with time, and the associated dummy station.

DETAILED DESCRIPTION OF THE INVENTION

In order to better understand the purpose of the invention, the following description provided for illustrative purposes and in no way restrictive, describes a particular embodiment of the invention, the <<dynamic mode>> for which management of mobility in the real time control phase is overriding.

FIG. 1 shows an L16 MIDS network 1 with several L 16 stations Si (Sx, Sy, Sz, . . . ) in which the following elements are shown specifically:

- an NCS (Network Control Station) station 2, with the main function of performing the network design starting from communication needs between stations Si and provided with real time control means for the deployed network,
- a technical network composed of all sub-networks dedicated to technical procedures, for example synchronization, PPLI (Precise Participant Localization and Identification) and real time control of stations Si by the NCS network. In particular, this network enables the NCS station to communicate with any station Si. A sub-network denotes the stations in the sub-network and the resources of the L16 link protocol allocated to them, which includes the time allocated for communication,
- an operational network defined by the complete set of sub-networks dedicated to useful information between stations Si. During operation, stations Si exchange information, for example transmission of control orders, return of signaling information from the different stations to control,
- one or several relays Ri, each relay being a subset of stations Si composed of stations dedicated to relaying.

The architecture of this network may change with time. For example, it may be necessary to modify the links of a set of stations Si. Let {Gi} be a station group, a subassembly of Si stations, that forms a mobile operational sub-network for which the electrical radio connectivity is not guaranteed in time.

The description of the principle used is based on the assumption that the mobility of stations in the group {Gi} does not affect the other operational sub-networks, which means that there is minimum interaction in the network definition. Otherwise, the principle of the process according to the invention will be extended to several sub-networks.

The concept of the invention is based on the design of a network that supports mobility of stations Gi without calling upon any additional resources in the allocation of timeslots (time duration allocated to a station).

In this respect, the process according to the invention may be broken down into a first phase denoted as being a network design phase, and a second phase related to the real time network control phase.

Phase 1=Network Design

This first phase includes the following principles and steps:

Principle P1: network design by the NCS Station, for example as follows:

- identify all stations Si forming the network; in the case of a MIDS terminal, there is a unique terminal identifier number,
- define relay stations Ri dedicated to relaying, the stations Ri are provided with the only technical network to make communications with the NCS station,
- produce the necessary resources for all Si stations starting from operational communications needs; the resources comprise time resources that must be available to a station Si (time-slot allocated to it),
- in practice, the NCS station generates a MIDS initialization file loaded for each station Si comprising the resources allocated for a station. The initialization file also comprises the following information: a station identification number, the position of a station in a given geographic reference system, the station transmission power, etc.

Principle P2

Communication between mobile stations Gi forming part of a subgroup that can move around with time is made using the repromulgation technique known to the expert in the subject.

This technique uses a check at the rerouted message when it is not intended solely for the station receiving it. Communications between stations Gi use <<needlines>>.

Principle P3: definition of a dummy station like that shown diagrammatically in FIG. 2.

For a group {Gi} of stations, a dummy station FGi is defined that is capable of relaying all the communication for the group. This dummy station has the property that it keeps resources initially assigned at the network design stage in memory, to form the different communication links between stations.

Thus, the dummy station FGi keeps an image of communications or communication links existing in a group, in its memory. If communications have to be restored during operation, the dummy station will be materialized into a real station to which resources will be allocated. For example, these data may include time resources used and allocated to the different stations in a real manner.

The following scheme may be set up: L16 MIDS resources called RGi are associated with a dummy station FGi. For example, these RGi resources are composed of information specific to group Gi, for example PG (STANAG 5516 abbreviation for Participation Group) numbers, route numbers, time slot allocations dedicated to communications in group Gi.

Phase 2—Real Time Network Control

The idea consists of setting up relays to find again the configuration of initially existing communications, since this configuration could have changed due to the mobility of the stations in the group Gi.

Principle P4

This is achieved in the network real time control phase by a step consisting of materializing one or several dummy stations FGi among the relay stations Ri and supplying them with all resources RGi calculated at the time of the network design. This is possible since a dummy station FGi is adapted to keep the initial resources in memory.

Principle P5

A relay Ri globally receives all resources for the dummy station that are transmitted from the NCS station.

For example, resources are transmitted from the NCS on an L 16 radio channel through the technical network by the use of L 16 J0.3 and J0.4 link messages where J0.3 corresponds to the time-slot and is used to assign time-slots dynamically. The transmitted message is composed of words J0.3l, J0.3E0, J0.3C1, and J0.4 corresponds to the radio relay control message and is used for dynamic management of relaying by repromulgation. The message is composed of words J0.4l, J0.4C2, for exclusive use in relaying by repromulgation.

The process is particularly useful as a forecasting tool. The NCS station can receive information about the variation with time of links between different stations forming a group Gi.

Different embodiments of the process could be imagined in order to optimize the number of relays to be provided for deployment in the design phase.

For example, a first variant embodiment consists for example of using the same relay for several groups Gi, Gj with the condition that the resources RGi, RGj are separated.

In a second variant embodiment of the process, a station Si that does not belong to a set of relays {Ri} is used to relay communications for one or several groups Gi, Gj. In order to implement this variant embodiment, the resources RGi and RGj must be separate and must not conflict with the operational resources of station Si.

According to another embodiment, called <<static mode>> in opposition to <<dynamic mode>> shown in FIGS. 1 and 2, static mode gives priority to the network design phase referred to above as phase 1.

As early as the network design phase, the relay stations Ri may for example be provided with one communication plan (MIDs initialization file) for each group Gi for which they may be required for relaying. Each communication plan loaded on a relay Ri is composed of the technical network and RGi dedicated to the group Gi.

In this embodiment, the resource transmission principle 5 is replaced by a local or remote activation on the relay Ri of the appropriate communication plan corresponding to the relaying need.

The invention claimed is:

1. A process for keeping and/or restoring communications within a network with planned resources, said network comprising stations arranged in at least one group, wherein each group includes at least two stations linked together, and links between the at least two stations can change with time, the process comprising:
   associating a dummy station to one of said at least one group, the dummy station comprising resources keeping an image of the communications existing in the at least one group, the dummy station not participating in the communications itself and configured to materialize into a real station, wherein the resources are allocated to the at least two stations in the at least one group;
   setting-up at least one relay station to keep and/or to restore communications between the at least two stations of the at least one group, based on information about how a group structure evolves; and
   reallocating resources of the dummy station to the at least one relay station after said setting-up, based on the information about how the group structure evolves;
   wherein said network comprises a L16 multifunctional information distribution system (MIDS) land network.

2. The process according to claim 1, wherein said reallocating resources is performed with a main station configured to design the network and to allocate resources.

3. The process according to claim 2, wherein said main station is a NCS station (network control station).

4. The process according to claim 1, wherein the relay station is configured to restore communications for a first and second group of the at least one group, wherein a first resource is associated with the first group and a second resource is associated with the second group, and the first and second resources are separate from each other.

5. The process according to claim 4, further comprising:
   receiving the second resource by a station associated with the first resource, wherein the station associated with the first resource is not belonging to the first group.

6. The process according to claim 1, further comprising
   providing at least one communication plan for each group by the at least one relay station; and
   allocating resources of the dummy station to the at least one relay station, by a local activation of the allocating in the dummy station.

7. The process according to claim 1, wherein the reallocating resources comprises at least one of a time reallocation dedicated to communications of the groups, PG numbers (participation group), or route numbers.

8. The process according to claim 1, wherein the process is performed within the at least one group.

9. The process according to claim 1, wherein the stations are mobile terminals.

10. The process according to claim 1, wherein the dummy station further includes:
    a memory storing resources initially assigned at the network design stage of the network with planned resources.

11. A system to keep and/or restore communications within a network with planned resources, said network comprising stations arranged in at least one group, wherein each group includes at least two stations linked together, and links between the at least two stations can change with time, the system comprising:
    a dummy station in connection with a group, comprising resources keeping an image of the communications existing in the at least one group, the resources allocated to stations in the group, the dummy station not participating in the communications itself and configured to materialize into a real station;
    a device configured to determine how a structure of the group changes;
    at least one relay station configured to keep and/or restore communications between the at least two stations of the group; and
    a device configured to reallocate resources of the dummy station to the at least one relay station;
    wherein said network comprises a L16 multifunctional information distribution system (MIDS) land network.

12. The system according to claim 11, wherein the device configured to reallocate resources is a station configured for network design and for allocation of resources.

13. The system according to claim 12, wherein the station is a NCS station (network control station).

14. The system according to claim 11, wherein the at least one relay station includes at least one communication plan for each group.

15. The system according to claim 11, wherein the at least one group is organized in at least one sub-network and the system is located in each of the at least one sub-network.

16. The system according to claim 11, wherein the dummy station further includes:

a memory storing resources initially assigned at the network design stage of the network with planned resources.

* * * * *